(12) United States Patent
Arman

(10) Patent No.: US 9,215,561 B1
(45) Date of Patent: Dec. 15, 2015

(54) LUGGAGE TRACKING ASSEMBLY

(71) Applicant: Kambiz Arman, Whittier, CA (US)

(72) Inventor: Kambiz Arman, Whittier, CA (US)

( * ) Notice: Subject to any disclaimer, the term of this patent is extended or adjusted under 35 U.S.C. 154(b) by 0 days.

(21) Appl. No.: 14/464,448

(22) Filed: Aug. 20, 2014

(51) Int. Cl.
*H04W 24/00* (2009.01)
*H04W 4/02* (2009.01)

(52) U.S. Cl.
CPC .................... *H04W 4/021* (2013.01)

(58) Field of Classification Search
CPC .................................................. H04W 4/021
USPC ................... 455/456.2, 456.1, 457
See application file for complete search history.

(56) References Cited

U.S. PATENT DOCUMENTS

| | | | |
|---|---|---|---|
| 6,147,602 A | 11/2000 | Bender | |
| 6,522,253 B1 | 2/2003 | Saltus | |
| 6,975,221 B2 | 12/2005 | Monck | |
| 7,535,358 B2 | 5/2009 | Crider et al. | |
| 7,802,724 B1 * | 9/2010 | Nohr | 235/384 |
| 7,916,025 B2 | 3/2011 | Locker et al. | |
| 8,253,557 B2 | 8/2012 | Ani et al. | |
| 2006/0077058 A1 | 4/2006 | Asher | |
| 2006/0087432 A1 * | 4/2006 | Corbett, Jr. | 340/572.1 |
| 2013/0214909 A1 * | 8/2013 | Meijers et al. | 340/10.5 |
| 2013/0324152 A1 * | 12/2013 | Lee et al. | 455/456.1 |
| 2014/0002239 A1 * | 1/2014 | Rayner | 340/5.61 |

* cited by examiner

*Primary Examiner* — Shahriar Behnamian

(57) ABSTRACT

A luggage tracking assembly includes a remote unit that may be carried by a user. A remote processor is coupled to the remote unit. A remote transceiver is coupled to the remote unit and the remote processor. The remote transceiver determines a location of the remote unit. A speaker is coupled to the remote unit and the remote processor. The speaker emits an alarm. An actuator is coupled to the remote unit and the remote processor. The actuator actuates the remote processor. A base unit may be coupled to an article of luggage. A base processor is coupled to the base unit. A base transceiver is coupled to the base unit and the base processor. The base transceiver determines a location of the base unit. The speaker emits the alarm when the base unit arrives at a trigger location with respect to the remote unit.

13 Claims, 4 Drawing Sheets

US 9,215,561 B1

LUGGAGE TRACKING ASSEMBLY

BACKGROUND OF THE DISCLOSURE

Field of the Disclosure

The disclosure relates to tracking devices and more particularly pertains to a new tracking device for tracking and location an article of luggage.

SUMMARY OF THE DISCLOSURE

An embodiment of the disclosure meets the needs presented above by generally comprising a remote unit that may be carried by a user. A remote processor is coupled to the remote unit. A remote transceiver is coupled to the remote unit. The remote transceiver is electrically coupled to the remote processor. The remote transceiver has GPS capabilities to determine a location of the remote unit. A speaker is coupled to the remote unit. The speaker is electrically coupled to the remote processor. The speaker emits an alarm. An actuator is coupled to the remote unit. The actuator is electrically coupled to the remote processor. The actuator actuates the remote processor. A base unit may be coupled to an article of luggage. A base processor is coupled to the base unit. A base transceiver is coupled to the base unit. The base transceiver is electrically coupled to the base processor. The base transceiver has GPS capabilities to determine a location of the base unit. The base transceiver is in communication with the remote transceiver. The speaker emits the alarm when the base unit arrives at a trigger location with respect to the remote unit. The user is alerted to the proximity of the base unit with respect to the remote unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
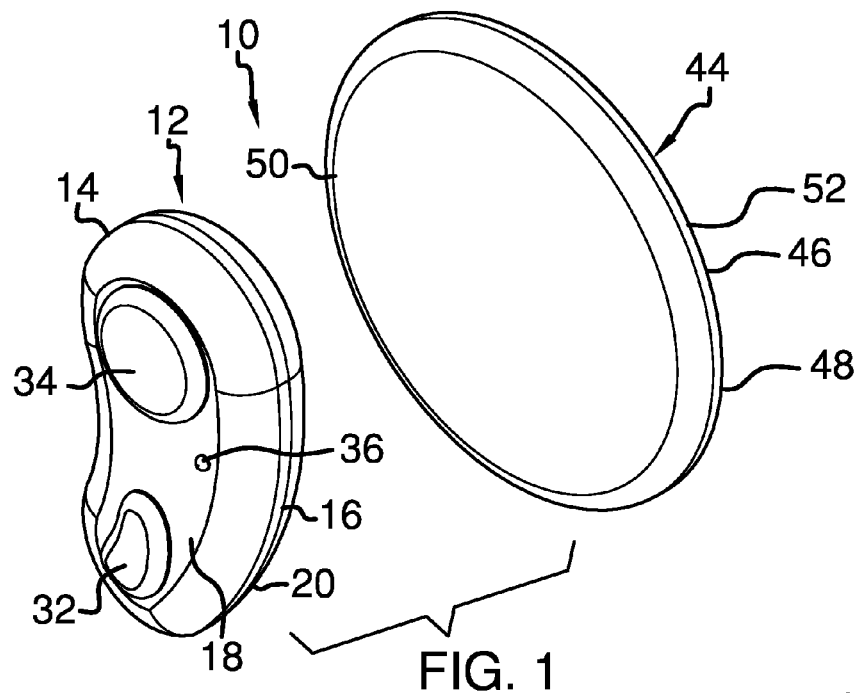
FIG. 1 is a perspective view of a luggage tracking assembly according to an embodiment of the disclosure.
Figure 2:
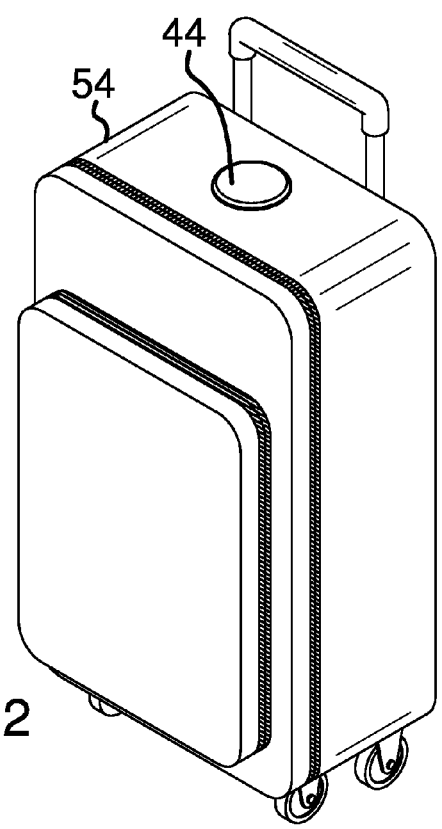
FIG. 2 is a top perspective view of an embodiment of the disclosure.
Figure 3:
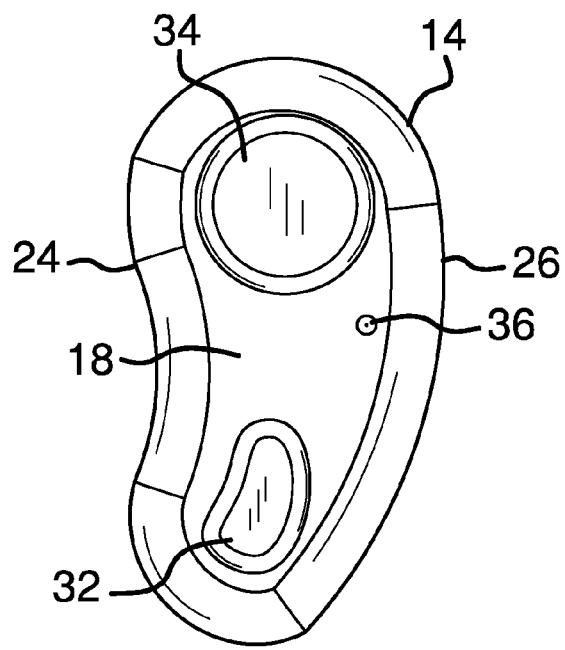
FIG. 3 is a top view of an embodiment of the disclosure.
Figure 4:
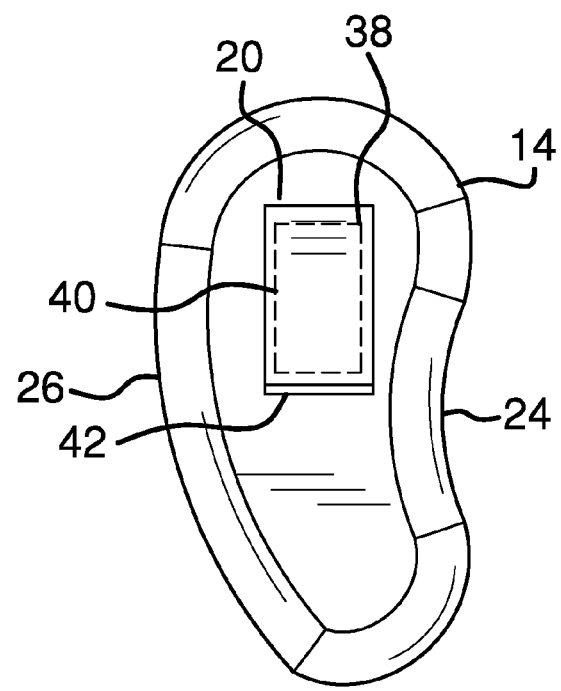
FIG. 4 is a bottom view of an embodiment of the disclosure.
Figure 5:
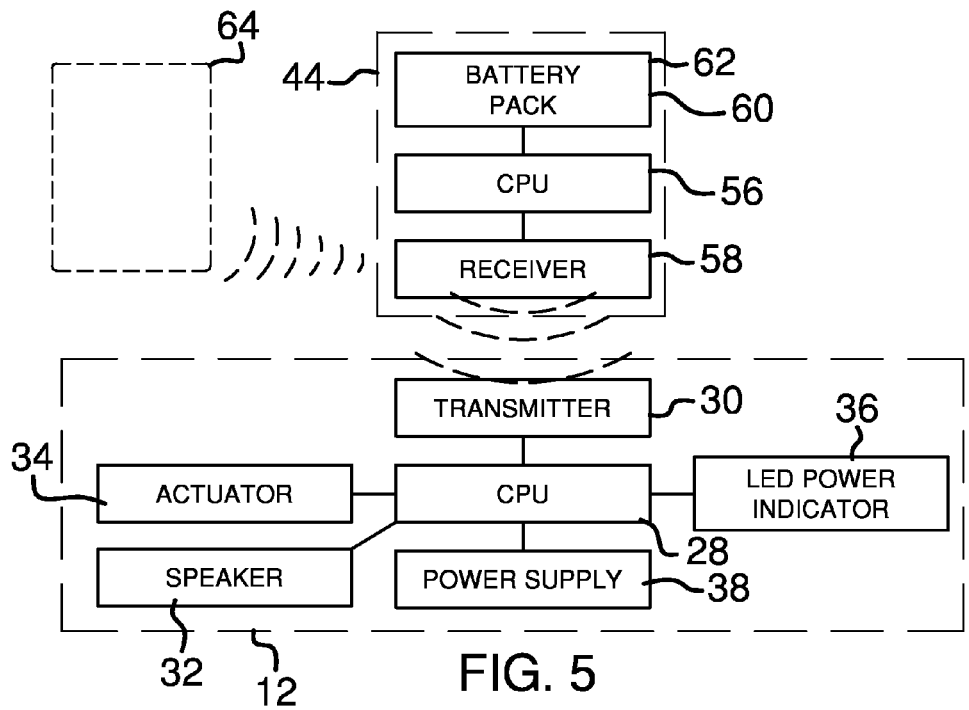
FIG. 5 is a schematic view of an embodiment of the disclosure.
Figure 6:
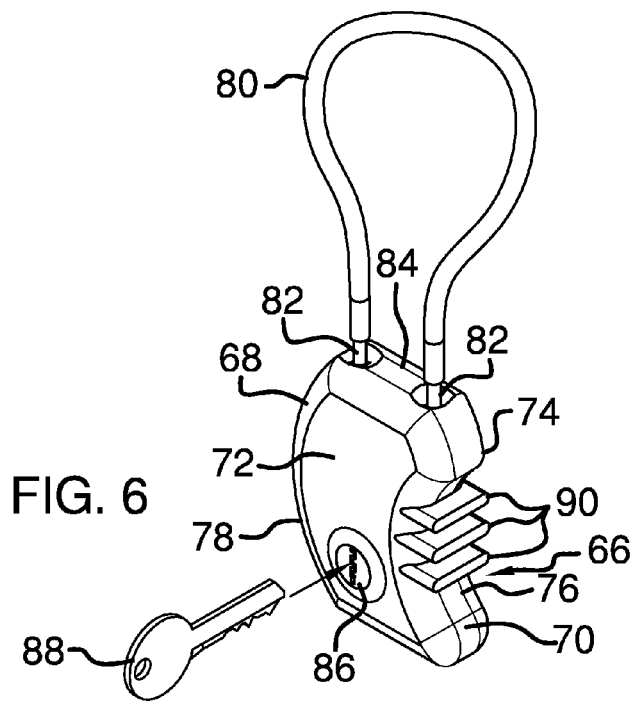
FIG. 6 is a perspective view of an alternative embodiment of the disclosure.
Figure 7:
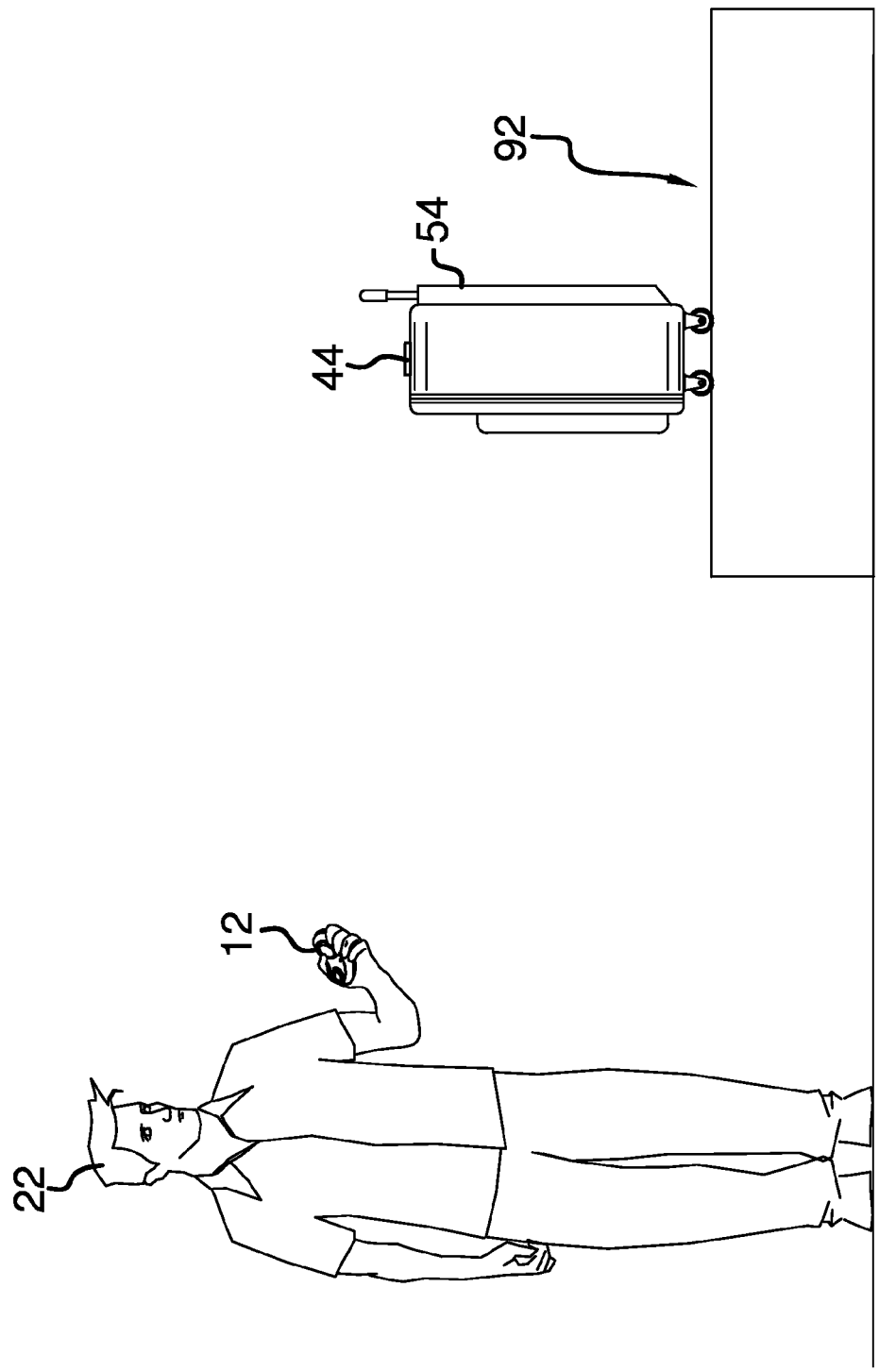
FIG. 7 is an in-use view of an embodiment of the disclosure.

With reference now to the drawings, and in particular to FIGS. 1 through 7 thereof, a new tracking device embodying the principles and concepts of an embodiment of the disclosure and generally designated by the reference numeral 10 will be described.

As best illustrated in FIGS. 1 through 7, the luggage tracking assembly 10 generally comprises a remote unit 12. The remote unit 12 has an outer wall 14. The outer wall 14 of the remote unit 12 has an exterior edge 16 extending between a top side 18 and a bottom side 20 of the outer wall 14 of the remote unit 12. The remote unit 12 may be carried by a user 22. Each of a first lateral side 24 and a second lateral side 26 of the exterior edge 16 of the outer wall 14 of the remote unit 12 may be curvilinear with each other. The remote unit 12 may have a kidney shape.

A remote processor 28 is coupled to the remote unit 12. The remote processor 28 may be an electronic processor of any conventional design. A remote transceiver 30 is coupled to the remote unit 12. The remote transceiver 30 is electrically coupled to the remote processor 28. The remote transceiver 30 may be an RF transceiver of any conventional design. Moreover, the remote transceiver 30 has GPS capabilities to determine a location of the remote unit 12.

A speaker 32 is coupled to the top side 18 of the outer wall 14 of the remote unit 12. The speaker 32 is electrically coupled to the remote processor 28. Additionally, the speaker 32 emits an alarm. The alarm is audible to the user 22.

An actuator 34 is coupled to the top side 18 of the outer wall 14 of the remote unit 12. The actuator 34 is accessible to the user 22. The actuator 34 is electrically coupled to the remote processor 28. Moreover, the actuator 34 actuates the remote processor 28.

A light emitter 36 is coupled to the top side 18 of the outer wall 14 of the remote unit 12. The light emitter 36 is electrically coupled to the remote processor 28. Additionally, the light emitter 36 selectively emits a beam of light. The light emitter 36 may be an LED of any conventional design. The light emitter 36 emits the beam of light when the remote processor 28 is actuated.

A remote power supply 38 is coupled to the remote unit 12. The remote power supply 38 is electrically coupled to the remote processor 28. The remote power supply 38 comprises at least one battery 40. A battery cover 42 is removably coupled to the bottom side 20 of the outer wall 14 of the remote unit 12. The remote power supply 38 is positioned beneath the battery cover 42.

A base unit 44 is provided. The base unit 44 has an exterior wall 46. The exterior wall 46 of the base unit 44 has an outer edge 48 extending between each of an upper side 50 and a lower side 52 of the base unit 44. The lower side 52 of the exterior wall 46 of the base unit 44 may be coupled to an article of luggage 54. Additionally, the base unit 44 is retained on the article of luggage 54. The outer edge 48 of the exterior wall 46 of the base unit 44 may be curved. Additionally, the base unit 44 may have a disk shape.

A base processor 56 is coupled to the base unit 44. The base processor 56 may be an electronic processor of any conventional design. A base transceiver 58 is coupled to the base unit 44. The base transceiver 58 is electrically coupled to the base processor 56. Additionally, the base transceiver 58 may be an RF transceiver of any conventional design. The base transceiver 58 has GPS capabilities to determine a location of the base unit 44.

The base transceiver 58 is in electromagnetic communication with the remote transceiver 30. The speaker 32 emits the alarm when the base unit 44 arrives at a trigger location with respect to the remote unit 12. Moreover, the user 22 is alerted to the proximity of the base unit 44 with respect to the remote unit 12. The trigger location of the base unit 44 may be a distance between 100 m and 300 m with respect to the remote unit 12.

A base power supply 60 is coupled to the base unit 44. The base power supply 60 is electrically coupled to the base processor 56. The base power supply 60 comprises at least one battery 62.

The base transceiver 58 may additionally be in electromagnetic communication with an external electronic device 64. The external electronic device 64 may be a Smart Phone of any conventional design. The external electronic device 64 displays a location of the base unit 44 with respect to the external electronic device 64. Additionally, the external electronic device 64 allows the user 22 to track a location of the base unit 44. The user 22 may be an individual engaging in air travel or other means of travel involving the use of the article of luggage 54.

Alternatively, the base unit 44 may comprise a lock 66. The lock 66 has an outermost wall 68. The outermost wall 68 of the lock 66 has a perimeter edge 70 extending between each of a front side 72 and a back side 74 of the outermost wall 68 of the lock 66. Each of a first oblique 76 and a second oblique side 78 of the perimeter edge 70 of the outermost wall 68 of the lock 66 may be curvilinear with each other. The lock 66 may have a kidney shape.

A cable 80 is provided. Each end 82 of the cable 80 is removably coupled to an upper side 84 of the perimeter edge 70 of the outermost wall 68 of the lock 66. The cable 80 forms a closed loop when each of the ends 82 of the cable 80 are coupled to the lock 66. The cable 80 engages the article of luggage 54 so the lock 66 is retained on the article of luggage 54.

A receiver 86 is coupled to the front side 72 of the outermost wall 68 of the lock 66. The receiver 86 may insertably receive a key 88. The key 88 selectively couples and uncouples the ends 82 of the cable 80 to the outermost wall 68 of the lock 66. The key 88 allows the lock 66 to be removed from the article of luggage 54.

A plurality of actuators 90 is movably coupled to the first oblique side 76 of the perimeter edge 70 of the outermost wall 68 of the lock 66. The actuators 90 are operationally coupled to the cable 80. The actuators 90 may be engaged by the user 22 to enter a combination into the lock 66. The lock 66 is removable from the article of luggage 54 when the user 22 enters the combination. The lock 66 may be a TSA lock.

In use, the user 22 tracks the location of the article of luggage 54 with the external electronic device 64. Additionally, the user 22 actuates the actuator 34 when the user 22 wishes to be alerted to the proximity of the article of luggage 54 with respect to the remote unit 12. The assembly 10 allows the user 22 to avoid waiting in a baggage claim area 92 until the article of luggage 54 has been delivered to the baggage claim area 92.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A luggage tracking assembly comprising:
a remote unit configured to be carried by a user;
a remote processor coupled to said remote unit;
a remote transceiver coupled to said remote unit, said remote transceiver being electrically coupled to said remote processor, said remote transceiver having GPS capabilities to determine a location of said remote unit;
a speaker coupled to said remote unit, said speaker being electrically coupled to said remote processor such that said speaker emits an alarm;
an actuator coupled to said remote unit, said actuator being electrically coupled to said remote processor such that said actuator actuates said remote processor;
a base unit configured to be coupled to an article of luggage;
a base processor coupled to said base unit; and
a base transceiver coupled to said base unit, said base transceiver being electrically coupled to said base processor, said base transceiver having GPS capabilities to determine a location of said base unit, said base transceiver being in communication with said remote transceiver such that said speaker emits the alarm when said base unit arrives at a trigger location with respect to said remote unit wherein the user is alerted to the proximity of said base unit with respect to said remote unit.

2. The assembly according to claim 1, further comprising said remote unit having an outer wall, said outer wall of said remote unit having an exterior edge extending between a top side and a bottom side of said outer wall of said remote unit.

3. The assembly according to claim 2, further comprising said speaker being coupled to said top side of said outer wall of said remote unit such that the alarm is audible to the user.

4. The assembly according to claim 2, further comprising said actuator being coupled to said top side of said outer wall of said remote unit such that said actuator is accessible to the user.

5. The assembly according to claim 1, further comprising a remote power supply coupled to said remote unit.

6. The assembly according to claim 5, further comprising said remote power supply being electrically coupled to said remote processor.

7. The assembly according to claim 6, further comprising said remote power supply comprising at least one battery.

8. The assembly according to claim 1, further comprising said base unit having an exterior wall, said exterior wall of said base unit having an outer edge extending between each of an upper side and a lower side of said base unit.

9. The assembly according to claim 8, further comprising said lower side of said exterior wall of said base unit being coupled to the article of luggage such said base unit is retained on the article of luggage.

10. The assembly according to claim 1, further comprising a base power supply coupled to said base unit.

11. The assembly according to claim 10, further comprising said base power supply being electrically coupled to said base processor.

12. The assembly according to claim 11, further comprising said base power supply comprising at least one battery.

13. A luggage tracking assembly comprising:
- a remote unit, said remote unit having an outer wall, said outer wall of said remote unit having an exterior edge extending between a top side and a bottom side of said outer wall of said remote unit such that said remote unit is configured to be carried by a user;
- a remote processor coupled to said remote unit;
- a remote transceiver coupled to said remote unit, said remote transceiver being electrically coupled to said remote processor, said remote transceiver having GPS capabilities to determine a location of said remote unit;
- a speaker coupled to said top side of said outer wall of said remote unit, said speaker being electrically coupled to said remote processor such that said speaker emits an alarm wherein the alarm is audible to the user;
- an actuator coupled to said top side of said outer wall of said remote unit such that said actuator is accessible to the user, said actuator being electrically coupled to said remote processor such that said actuator actuates said remote processor;
- a remote power supply coupled to said remote unit, said remote power supply being electrically couple to said remote processor, said remote power supply comprising at least one battery;
- a base unit having an exterior wall, said exterior wall of said base unit having an outer edge extending between each of an upper side and a lower side of said base unit, said lower side of said exterior wall of said base unit being coupled to an article of luggage such said base unit is retained on the article of luggage;
- a base processor coupled to said base unit;
- a base transceiver coupled to said base unit, said base transceiver being electrically coupled to said base processor, said base transceiver having GPS capabilities to determine a location of said base unit, said base transceiver being in communication with said remote transceiver such that said speaker emits the alarm when said base unit arrives at a trigger location with respect to said remote unit such that the user is alerted to the proximity of said base unit with respect to said remote unit; and
- a base power supply coupled to said base unit, said base power supply being electrically coupled to said base processor, said base power supply comprising at least one battery.

\* \* \* \* \*